Jan. 23, 1945.    G. A. ORMEROD    2,367,735
GAS METER
Filed Oct. 25, 1943    2 Sheets-Sheet 1

Inventor
George Arnold Ormerod
by Mawhinney & Mawhinney
Attorneys

Jan. 23, 1945.　　　G. A. ORMEROD　　　2,367,735
GAS METER
Filed Oct. 25, 1943　　　2 Sheets-Sheet 2

Inventor
George Arnold Ormerod
by Mawhinney & Mawhinney
Attorneys

Patented Jan. 23, 1945

2,367,735

UNITED STATES PATENT OFFICE 2,367,735

GAS METER

George Arnold Ormerod, Liverpool, England, assignor of three-fourths to Alfred Smith, George Henry Robinson, and Dennis Mathwin Robinson, Liverpool, England Application October 25, 1943, Serial No. 507,578
In Great Britain June 4, 1942

16 Claims. (Cl. 73—268)

This invention relates to a gas meter of the kind having a partition dividing the body of the meter into two main chambers in each of which there is a bellows device or diaphragm dividing it into two measuring chambers.

In the usual arrangement each diaphragm (while the meter is delivering) oscillates a flag shaft carrying an arm, the two arms rotating a crank spindle by which valves controlling the flow of gas into and out of the measuring chambers are worked.

My main object is to provide a gas meter of this kind which will be of simple construction and will be capable of delivering a very considerable quantity of gas, for a given size, compared with known forms of meter.

A further object of the invention, as applied to a gas meter of the kind specified, is to provide each main chamber with valves communicating, respectively, with each chamber through different faces of the chamber—that is, through faces of the chamber which are not parallel to the diaphragm. Each movable valve element, it will be understood, may control two inlet ports, or two exhaust ports, one for each measuring chamber on one side of the partition.

A further object of the invention, in a meter of the kind specified, is to provide each measuring chamber with valves which communicate with each chamber through all the faces of the chamber, respectively, except those which are parallel to the diaphragm, each movable valve element again controlling two ports.

A still further object of the invention, in a meter as aforesaid, is to provide each main chamber with separate inlet and exhaust valves disposed on different faces of the chamber, preferably on opposite faces. For the greatest possible gas flow for a given size, the body may be of rectangular section and provided with two double-ported inlet valves associated, respectively, with two adjacent faces of each main chamber, the four inlet valves being served from a common inlet at the adjacent corner, and two double-ported exhaust valves are associated with the other two adjacent faces of each main chamber, respectively, the four exhaust valves serving a common outlet at the corner opposite that at which the common inlet is provided.

For an understanding of these and other objects and advantages of the invention, reference should be directed to the following description in connection with the accompanying diagrammatic drawings, in which—

Figure 1:
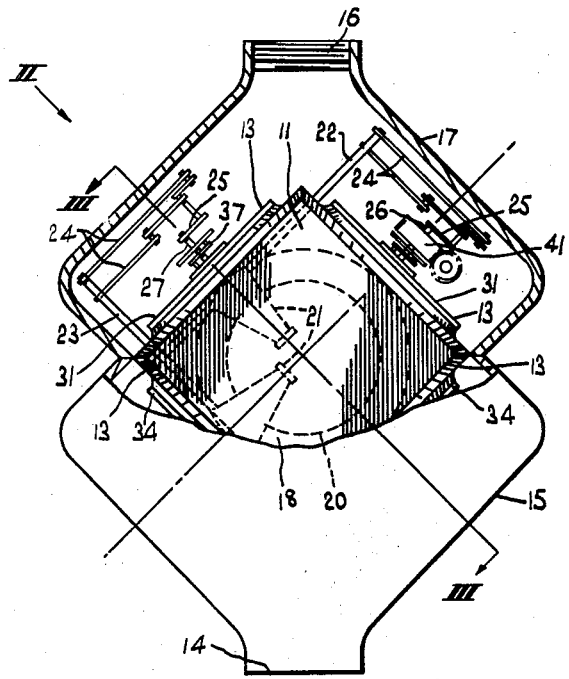
Figure 1 is a part-sectional elevation of one form of gas meter according to the invention.
Figure 2:
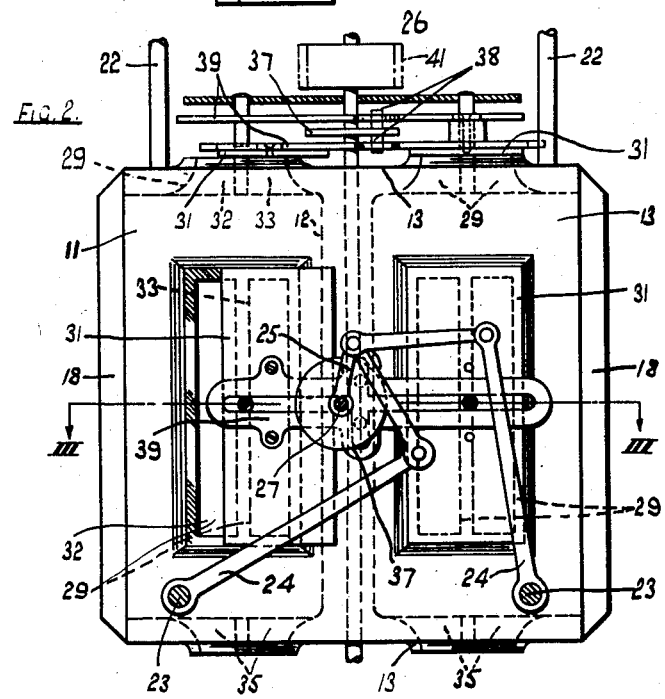
Figure 2 is an elevation, to a larger scale, looking in the direction of the arrow II of Figure 1, but with the outer casing and the lower valve mechanism omitted.
Figure 3:
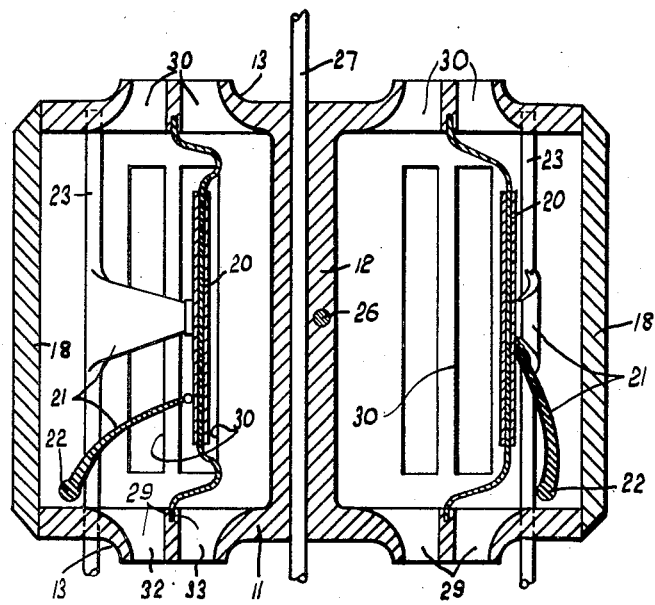
Figure 3 is a fragmentary section, also to the larger scale, mainly on the lines III—III of Figure 1 or of Figure 2.

In the construction shown in Figures 1 to 3 the rectangular parallelepipedal body 11 is formed integrally with the partition 12 as a die-casting, and, for greatest efficiency, all four faces 13 (transverse to the partition) are used as valve plates to provide valve ports. The common inlet 14 is arranged at the corner of an angle-shaped cover 15 for the two lower adjacent faces 13, the common outlet 16 being at the corner of another angle-shaped cover 17 for the remaining two faces 13. The faces parallel to the partition may be closed by plain panels 18.

Each diaphragm 20 actuates two arms 21, or flags as they are commonly called, on flag shafts 22, 23 which are at rightangles to one another and extend through the two top faces of the body into the exhaust chamber beneath the cover 17. The two flag shafts 22 are connected in a known manner (Figure 1) by arms 24 to a tangent arm 25 by which a valve-actuating spindle 26 can be continuously rotated, the spindle 26 extending through the body to also actuate the valves on the far side, and in like manner the two flag shafts 23 can drive the valve-actuating spindle 27, also extending right through the body.

In the present instance each end of each valve-actuating spindle (26 or 27) works slide valves or valve covers associated with the ports in the opposite faces 13, the ports 29 in the top faces 13 being, of course, exhaust ports and those 30 in the bottom faces inlet ports. Thus, each main chamber has two exhaust valve covers 31 movable in unison, these serving in one position to uncover two exhaust ports 29 (specifically marked 32, 32) to one of the measuring chambers, and in the other position to uncover two exhaust ports (specifically marked 33, 33) communicating with the other measuring chamber on the other side of the diaphragm. There will, therefore, be altogether four exhaust valve covers 31 each controlling two exhaust ports, and similarly, there are four inlet valve covers 34 (each coating with two inlet ports 30) for the whole meter. The valve covers 31 and 34 are respectively actuated in the manner disclosed in British patent specification No. 548,691, a disc 37 on a valve-actuating spindle carrying pins engaged in transverse slots in brackets 39 fast with the different valve covers.

The crank spindle 26 is shown as being provided with a worm 41 to rotate a worm wheel connected to the indicating mechanism in the usual manner.

Obviously, if desired, one of the inlet and one of the exhaust valve covers associated with each main chamber could be omitted, in which case the remaining inlet and exhaust valve covers would preferably be on opposite faces, though they could, if preferred, be on adjacent faces. As there is no transfer port each valve cover can be in the form of a flat plate as shown. The covers will be pressed to their seats by the pressure difference of the gas on opposite faces, and obviously resilient or counterpoise means could be used to assist in keeping the covers against their seats.

Some of the advantages of this construction are that the gas will pass straight through the measuring chambers, from the inlet port or ports to the outlet port or ports, and a much greater quantity can be passed for a given size of meter owing to the increased valve area, whilst in addition, the use of restricted gas passages is avoided. Expressed another way—for a given capacity of meter very much less material will be used in the construction of the meter, which will be considerably smaller and, therefore, less expensive to produce.

Some of the advantages of the invention can be obtained, in the case of valve covers each incorporating a transfer port as is common practice at the present time, by providing such valve covers on different faces of each main chamber, as above-mentioned, though in this case it will be necessary to use only two such valve covers, for each main chamber, associated with opposite faces thereof.

Figures 4, 5:
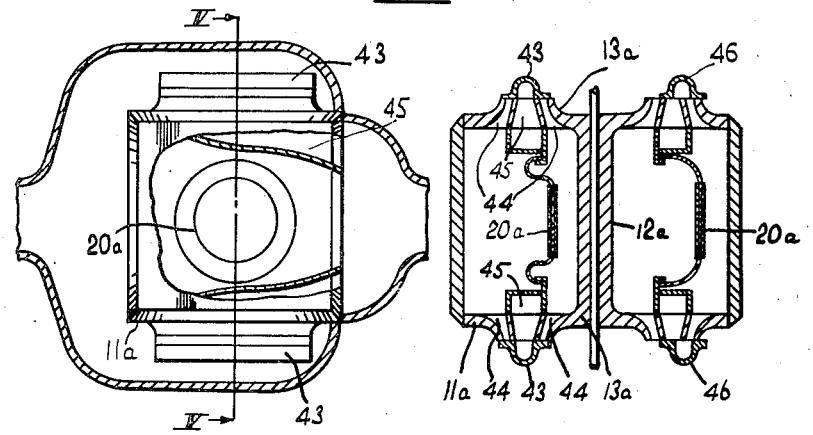
Figure 4 is a part-sectional plan, mainly in outline, of another form of gas meter according to the invention.
Figure 5 is a section on the line V—V of Figure 4.

Such an arrangement is shown by Figures 4 and 5, in which 11a represents the body, 12a the partition, and 13a, 13a two valve plates, the diaphragms being indicated at 20a. 43, 43 are domed valve covers for one main chamber, each controlling two inlet ports 44, 44 (for the two measuring chambers) and a common exhaust port 45. The two valve covers associated with opposite faces of the other main chamber, are marked 46, 46.

It is not essential that the body should be of rectangular section.

What I claim as my invention and desire to secure by Letters Patent of the United States is:

1. A gas meter comprising a hollow body divided by a partition into two main chambers, a diaphragm dividing each main chamber into two measuring chambers, and valves associated, respectively, with different faces of each main chamber, means conjointly operable by both of said diaphragms for operating the valves in each face.

2. In a gas meter, a hollow body providing two main chambers, a diaphragm dividing each main chamber into two measuring chambers, each of the latter chambers having ports in different faces, movable valve elements controlling the opening and closing of said ports, and actuating means for the valves of each face, separately operable by said diaphragms for operating the valve elements in each face.

3. In a gas meter, a hollow body providing two main chambers, a diaphragm dividing each main chamber into two measuring chambers, each of the latter chambers having ports in different faces, such faces being substantially at right angles to the diaphragms, slidable valve covers coacting with said ports, and movable valve elements controlling said covers, said valve elements being actuated by said diaphragms through spindles extending between points outside said ported faces.

4. In a gas meter, a hollow body providing two main chambers, a diaphragm dividing each main chamber into two measuring chambers, each of two different faces of each main chamber having two elongated ports in it communicating, respectively, with the two measuring chambers, the major dimensions of said ports being substantially parallel to the diaphragms, slidable valve covers controlling said ports, and movable valve elements controlling said covers, said valve elements being actuated by said diaphragms through spindles extending between points outside said ported faces.

5. In a gas meter, a hollow body providing two main chambers, two diaphragms dividing each main chamber into two measuring chambers, each of two different faces of each main chamber having two elongated ports in it communicating, respectively, with the two measuring chambers, the major dimensions of said ports being substantially parallel to the diaphragms, a slidable valve cover associated with each of said faces to control both the ports therein, said valve covers being slidable in directions substantially at right angles to the diaphragms, and movable valve elements controlling said covers, said valve elements conjointly operable by both said diaphragms through spindles extending between points outside said ported faces for operating the valve covers in each face.

6. In a gas meter, a hollow body providing two main chambers, a diaphragm dividing each main chamber into two measuring chambers, each of the latter chambers having ports in opposite faces, one being an inlet and one an outlet port, and movable valves controlling the opening and closing of said ports, and valve elements conjointly operable by both said diaphragms for operating the valves in each face.

7. In a gas meter, a hollow body divided by a partition into two main chambers, a diaphragm dividing each main chamber into two measuring chambers, each of the latter chambers having inlet and outlet ports respectively in different faces, and movable valves controlling the opening and closing of said ports, and valve elements conjointly operable by both said diaphragms and being interconnected by rotary spindles extending between points outside said ported faces for operating the valves in each face.

8. In a gas meter, a hollow body providing two main chambers, a diaphragm dividing each main chamber into two measuring chambers, each of the latter chambers having ports in all the faces except that face which is substantially parallel to the diaphragms, a gas inlet chamber communicating with all the ports in two adjacent ported faces, a gas exhaust chamber communicating with all the remaining ports, and movable valves controlling the opening and closing of said ports, and valve elements conjointly actuated by both said diaphragms and being interconnected on opposite faces by spindles extending between points outside said ported faces for operating the valves in each face.

9. In a gas meter, a hollow body providing two main chambers, a diaphragm dividing each main chamber into two measuring chambers, each of the latter chambers having ports in opposite faces, one being an inlet and one an outlet port, spindles extending between points outside said ported faces, and movable valve elements controlling the opening and closing of said ports, said valve elements being conjointly actuated by said diaphragms and being interconnected by said spindles extending between points outside said ported faces.

10. In a gas meter according to claim 9, and substantially parallel flagstaffs respectively actuated by the diaphragms and connected with said spindles so as to drive them.

11. A gas meter comprising a hollow body in the shape of a rectangular parallelepiped divided by a partition into two main chambers, a diaphragm dividing each main chamber into measuring chambers, and valves associated, respectively, with all of the faces of each said chamber except the two opposite faces which are parallel to the partition, means actuated by said diaphragm for operating said valves, said last mentioned means including means extending between points outside said faces and interconnecting the valves on opposite faces.

12. A gas meter comprising a hollow body in the shape of a rectangular parallelepiped divided by a partition into two main chambers, a diaphragm dividing each main chamber into two measuring chambers, valves associated, respectively, with all of the faces of each main chamber except the two opposite faces which are parallel to the partition, and a gas inlet chamber coacting with two adjacent faces having associated valves, and a gas outlet chamber coacting with the two remaining faces having associated valves, means actuated by said diaphragms for operating said valves, said last mentioned means including means extending through said partition between points outside said faces and interconnecting the valves on opposite faces.

13. A gas meter comprising a hollow body in the form of a rectangular parallelepiped, a partition dividing said body into two main chambers, a diaphragm dividing each main chamber into two measuring chambers, inlet valves in two adjacent faces of said body for each of the four measuring chambers to establish communication with a common inlet port, exhaust valves in two adjacent faces of said body respectively opposite said inlet valves and for each of said measuring chambers to establish communication with a common exhaust port, and actuating means operated by each of said diaphragms to move said inlet and said exhaust valves.

14. A gas meter comprising a hollow body in the form of a rectangular parallelepiped, a partition dividing said body into two main chambers, a diaphragm dividing each main chamber into two measuring chambers, inlet valves in two adjacent faces of said body for each of the four measuring chambers to establish communication with a common inlet port, exhaust valves in two adjacent faces of said body respectively opposite said inlet valves and for each of said measuring chambers to establish communication with a common exhaust port, and actuating means operated by each of said diaphragms to move said inlet and said exhaust valves, pairs of valves on each face being connected with pairs of valves on the opposite face by means of a rotary spindle passing through said partition.

15. A gas meter comprising a hollow body in the form of a rectangular parallelepiped, a partition dividing said body into two main chambers, a diaphragm dividing each main chamber into two measuring chambers, a set of valves comprising a pair of inlet valves in two adjacent faces of said body for each of the four measuring chambers to establish communication with a common inlet port, a pair of exhaust valves in two adjacent faces of said body respectively opposite said inlet valves and for each of said measuring chambers to establish communication with a common exhaust port, a pair of flagshafts at right angles to one another operable by each diaphragm, the parallel pairs of said flagshafts actuating conjointly each pair of valves.

16. A gas meter comprising a hollow body in the form of a rectangular parallelpiped, a partition dividing said body into two main chambers, a diaphragm dividing each main chamber into two measuring chambers, a set of valves comprising a pair of inlet valves in two adjacent faces of said body for each of the four measuring chambers to establish communication with a common inlet port, a pair of exhaust valves in two adjacent faces of said body respectively opposite said inlet valves and for each of said measuring chambers to establish communication with a common exhaust port, a pair of flagshafts at right angles to one another operable by each diaphragm, the parallel pairs of said flagshafts actuating conjointly each pair of valves, the pairs of valves on each face being connected with the pairs of valves on the opposite face by means of a rotary spindle passing through said partition.

GEORGE ARNOLD ORMEROD.